United States Patent

Sackett

[11] Patent Number: 5,821,461
[45] Date of Patent: Oct. 13, 1998

[54] WATERPROOF SPLICE FOR CABLES HAVING DIFFERENT INSULATION MATERIALS AND METHOD OF MAKING SAME

[75] Inventor: James A. Sackett, Houston, Tex.

[73] Assignee: Shaw Industries Limited, Rexdale, Canada

[21] Appl. No.: 859,016

[22] Filed: May 20, 1997

[51] Int. Cl.⁶ .................................................. H02G 15/08
[52] U.S. Cl. ...................................... 174/75 B; 174/84 R
[58] Field of Search ................................ 174/84 R, 74 A, 174/75 B, 84 C

[56] References Cited

U.S. PATENT DOCUMENTS

| | | | |
|---|---|---|---|
| 2,688,651 | 9/1954 | Blake | 174/84 R X |
| 3,144,507 | 8/1964 | Scadron | 174/84 R |
| 3,553,631 | 1/1971 | Shlesinger, Jr. | 174/84 R X |
| 3,695,642 | 10/1972 | DeWoody | 174/84 R X |
| 3,984,912 | 10/1976 | Johnston et al. . | |
| 4,025,717 | 5/1977 | Whittingham . | |
| 4,157,208 | 6/1979 | Roberts et al. . | |
| 4,200,768 | 4/1980 | Anhalt et al. . | |
| 4,207,429 | 6/1980 | Ward . | |
| 4,233,096 | 11/1980 | Wiberg . | |
| 4,450,318 | 5/1984 | Scardina et al. | 174/84 R |
| 4,501,927 | 2/1985 | Sievert | 174/84 R X |
| 4,619,493 | 10/1986 | Kikuta . | |
| 4,678,866 | 7/1987 | Charlebois | 174/84 R X |
| 4,721,832 | 1/1988 | Toy . | |
| 4,935,582 | 6/1990 | Calligaris . | |
| 5,140,746 | 8/1992 | Debbaut . | |
| 5,152,944 | 10/1992 | Khalil . | |
| 5,357,057 | 10/1994 | Debbaut . | |
| 5,459,285 | 10/1995 | Curto et al. . | |
| 5,502,279 | 3/1996 | Mirebeau et al. . | |
| 5,502,280 | 3/1996 | Rocci et al. . | |

Primary Examiner—Dean A. Reichard
Attorney, Agent, or Firm—Vaden, Eickenroht & Thompson, L.L.P.

[57] ABSTRACT

A waterproof splice for use in connecting two multiconductor electric cables having jackets of different insulation material and a method of making the splice are disclosed. The splice consists of a mechanical electrical connection between the conductors, a mechanical bond formed on the insulation of one of the conductors and a sheath of insulation material molded over the splice and adjacent cables. The sheath bonds with the jacket of one cable and the mechanical bond formed on the insulation of the other cable. The mechanical bond is a seal ring of elastomeric material that is compressed between glands to move the seal ring into sealing engagement with the conductor. The disclosed splice is both strong and waterproof in spite of the poor bonding characteristics between the two different insulation materials on the two conductors. The splice is appropriate for cables having surface, subsurface and underwater applications and is specifically designed for use in conducting seismic surveying operations.

8 Claims, 3 Drawing Sheets

WATERPROOF SPLICE FOR CABLES HAVING DIFFERENT INSULATION MATERIALS AND METHOD OF MAKING SAME

BACKGROUND OF THE INVENTION

1. Field of the Invention

This invention relates to a splice for connecting multi-conductor electrical and communications cables that are subjected to particularly adverse conditions and environments.

In particular, this invention relates to a splice for cables used in the seismic industry having outer jackets of different elastomers. Cables in this industry are used to perform seismic surveys on land and in underwater applications. Any splice in such a cable must have high tensile strength as well as being waterproof. In addition, the cables are typically subjected to significant bending during transportation, storage and the repeated installations that will occur over their useful life. Bending produces both tensile and compression stresses in a splice that can be relatively high depending on the radius of the bend. These stresses, in particular, can cause a failure of the seal at the splice.

A further complication of this waterproofing problem occurs when a splice joins two cables having jackets of different insulating materials. When the cables have outer jackets of the same or chemically compatible materials, a waterproof splice may be achieved by electrically and mechanically connecting the conductors and overmolding the splice and portions of the jackets of each cable with a sleeve or sheath of the same material as the jackets. Being made of the same material, the sheath forms a strong chemical bond with the outer jacket of the cables that is sufficiently strong to maintain the integrity of the splice when subjected to the stresses described above. When the material of the sheath is different from the jacket material of one of the cables and the two materials are also chemically incompatible, at best only a weak chemical bond will form between the two materials. This limits the applications in which the cable can be used.

2. Description of the Prior Art

Chemical compatibility as used herein refers to the ability of two materials to form a strong chemical bond to one another. For instance, it is well known in the art that neoprene and polyurethane do not form a strong bond to one another. This chemical incompatibility creates a problem in that there is frequently a need to interface cables having jackets of these materials. In such an instance, if neoprene is molded over a splice directly to a polyurethane jacketed cable, or vice versa, a weak bond results that is susceptible to failure under mild stress or bending.

The seismic industry is concerned with cable splicing but has not adequately addressed the problem of splicing together conductors jacketed with different insulation materials. For instance, in U.S. Pat. No. 3,984,912 issued to Johnston et al., the stripped conductors of two cables are inserted into a conductive connector and crimped in place. An inner and an outer liner of a heat cured polymer is then applied over the connector and the insulation on the cables. It is emphasized that the polymer liners should be chemically compatible with each other and with the insulation on the cables to insure an adequate bond and a waterproof connection.

A typical means for creating a waterproof splice between two cables is to connect the conductors and overmold the connection with an elastomeric polymer that matches the insulation on the cables. U.S. Pat. No. 4,025,717 issued to Whittingham, is a an example of this method as it is carried out on shielded high voltage electrical cables. The improvement disclosed in Whittingham is to wrap a mesh of polyurethane around the conductors and over a portion of the insulation on the cables before overmolding. Using an injection molding process, the injected material fills the interstitial spaces in the mesh to provide an improved bond. Again, the use of the same or chemically compatible materials for the overmold and the conductor jackets is emphasized in order to obtain an adequate bond.

U.S. Pat. No. 5,152,944, which issued Oct. 6, 1992 to Hanna Khalil, describes a method of making an electrical connector that includes a neoprene boot bonded to a polyurethane-jacketed two conductor cable. The method includes bonding neoprene to polyurethane by etching the urethane surface, coating the etched surface with a bonding agent, applying to the coated surface a neoprene film and contacting the neoprene film with a quantity of neoprene under suitable temperature and pressure.

As described in the specification of the patent, the method is substantially more involved and time-consuming. Specifically, after etching and cleaning the surface of the polyurethane jacket, it is coated with a first bonding agent that requires four to six hours to dry. Then a second bonding agent is applied that requires three to eight hours to dry. The jacketed conduit is then placed in a mold and neoprene is molded around the conduit. This takes a molding temperature of 245° F. to 265° F. and a pressure of 65 psi. Curing time is 25 minutes. After the connector is removed from the mold, it is cured for an additional twelve hours at 195° F.

Obviously, the '944 patent describes a method of forming a strong bond between a polyurethane-jacketed electrical conduit and a neoprene boot covering an electrical plug that is electrically connected to the polyurethane-jacketed cable.

SUMMARY OF THE INVENTION

It is an object and feature of Applicant's invention, however, to provide a waterproof splice between a polyurethane-jacketed, multiconductor, electric cable and a neoprene-jacketed, multiconductor, electric cable that includes a sheath of neoprene that is bonded to the neoprene-jacketed cable but not to the urethane jacketed cable thereby eliminating the time-consuming procedure required to bond neoprene to polyurethane as described in the '944 patent while providing a waterproof splice of the two cables.

These and other objects, advantages, and features of this invention will be apparent to those skilled in the art from a consideration of this specification including the drawings and appended claims.

BRIEF DESCRIPTION OF THE DRAWINGS

In the Drawings:

FIG. 3b is a side view of the overmold of FIG. 3a.

DESCRIPTION OF THE PREFERRED EMBODIMENTS

Figure 1:
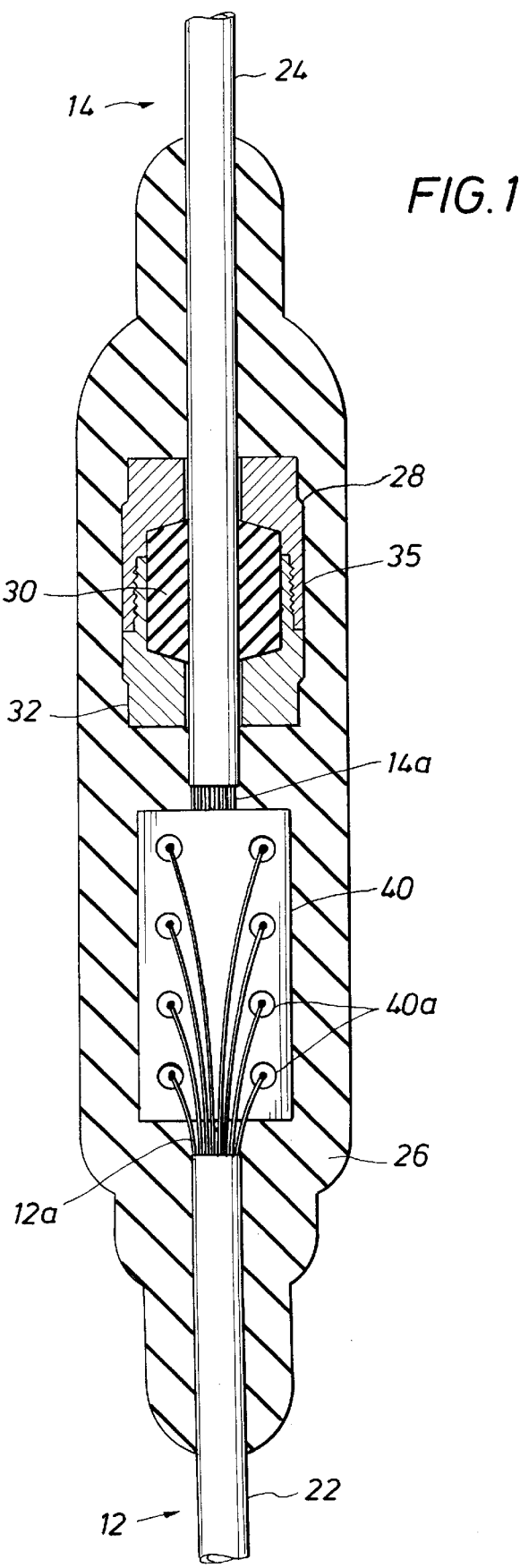
FIG. 1 is a longitudinal sectional view through the waterproof splice 10 of this invention.
Figure 2C:
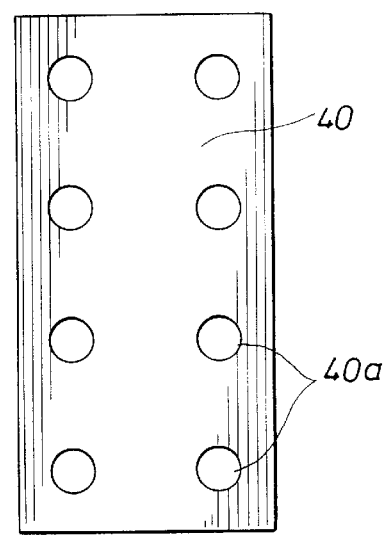
FIG. 2c is a view in elevation of the solder board through the holes of which the individual conductors of each cable are connected by soldering or intertwining.
Figure 2A:
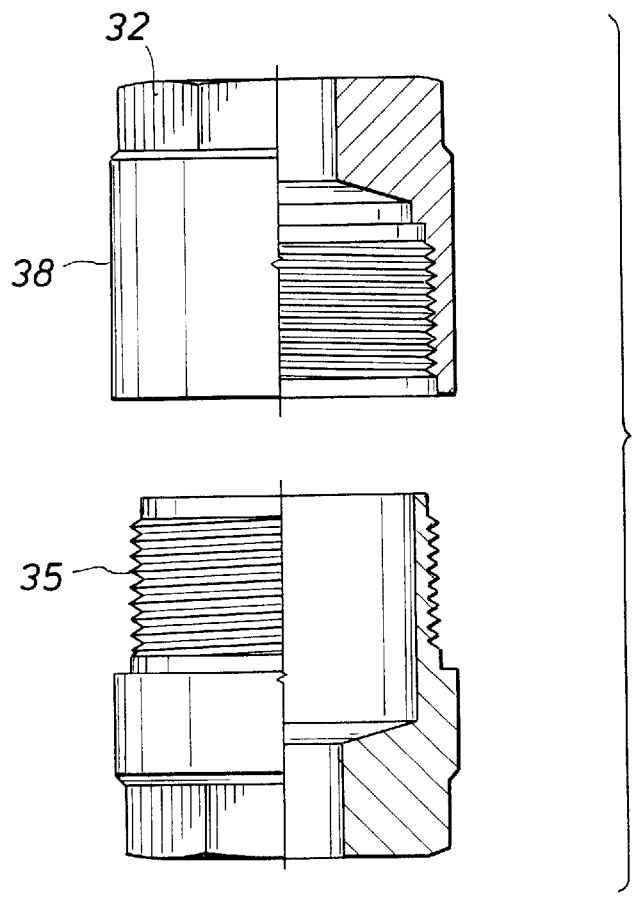
FIG. 2a is an exploded view partly in section and partly in elevation of the glands used to compress the seal shown in FIG. 2b.
Figure 2B:
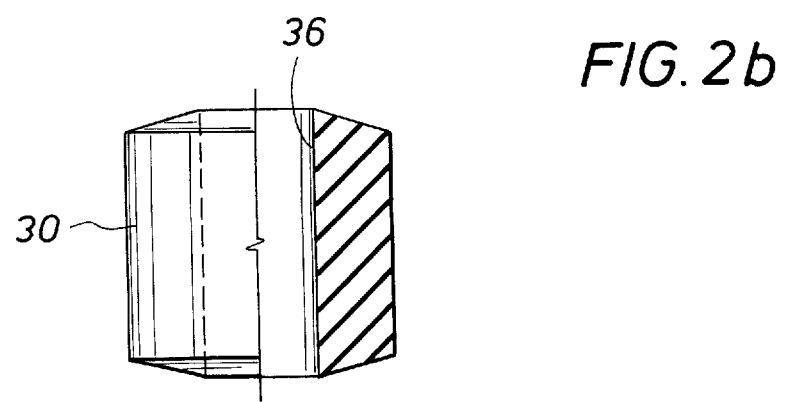
FIG. 2b is a view partly in section and partly in elevation of the seal for the polyurethane-jacketed multiconductor cable.
Figure 3A:
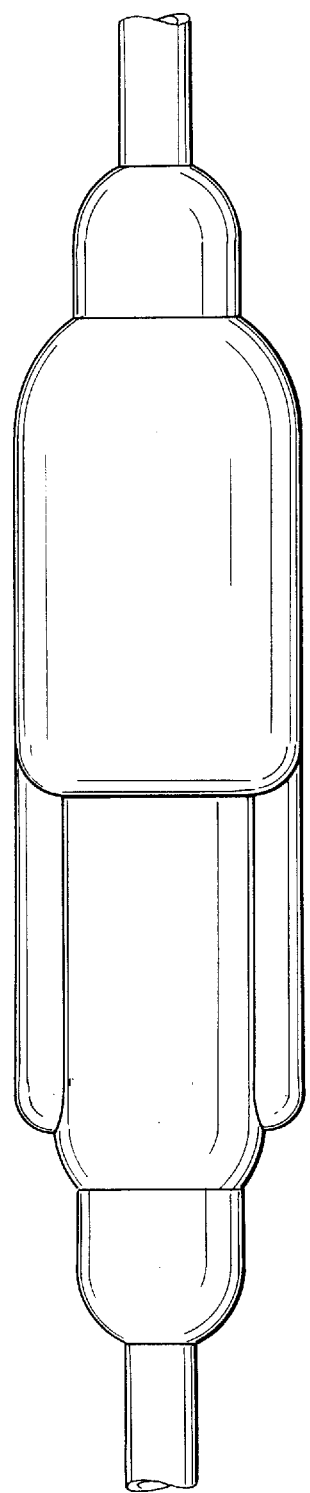
FIG. 3a is a top view of a waterproof splice of the present invention showing the external configuration of the overmold.
Figure 3B:
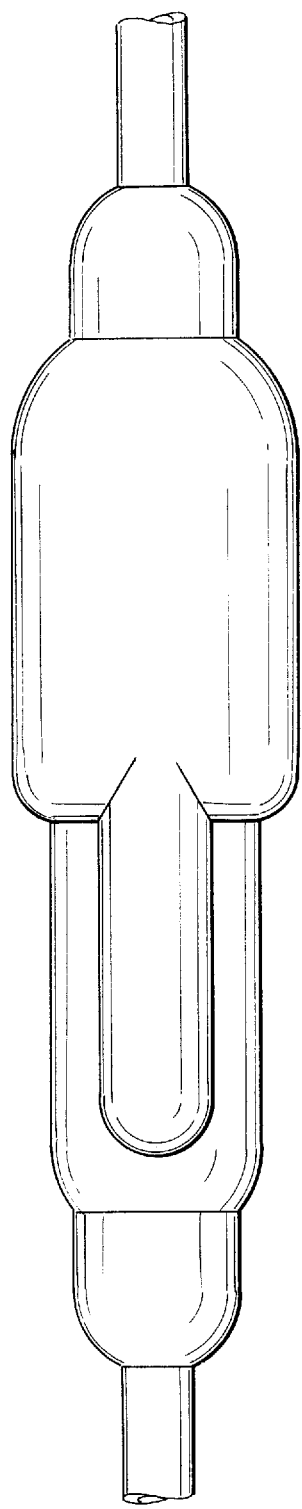

The waterproof splice 10 shown in FIG. 1 includes two multiconductor cables 12 and 14 that have outer jackets 22 and 24 of polyurethane and neoprene, respectively.

Conductors 12a and 14a of cables 12 and 14 are electrically connected by intertwining each conductor 12a with one of conductors 14a or by soldering each conductor 12a to a conductor 14a through openings 40a in solder board 40. Solder board 40 is made of a non-conducting material such as is used in the manufacture of circuit boards for computers and other electrical instruments.

Since the splice must be protected from ambient conditions and because an elastomer, such as urethane is readily molded into a waterproof sheath 26 over the splice and will bond to the polyurethane-jacketed cable 12 to provide a seal, urethane is the elastomer of choice. As a result, means must be provided that will form a seal with the neoprene-jacketed cable 14 and the urethane sheath. This is accomplished as follows:

Seal member 30, having opening 36 therethrough, is positioned on cable 14 between glands 28 and 32. The glands are moved to compress seal member 30 by relative rotation of the glands causing threads 35 and 38 to move the glands together and compress the seal into sealing engagement with cable 14. The outer surface of the glands are scored, or etched, or covered with a material that will bond to urethane. The last step then is to mold a urethane sheath 26 over the splice as shown in FIG. 1.

The splice could also be made using a neoprene that will readily bond to the neoprene-jacketed cable and to the glands attached to the polyurethane-jacketed cable.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in the limiting sense.

What is claimed is:

1. A method of forming a waterproof splice of two multiconductor electric cables having outer insulating jackets of different elastomers each cable having a plurality of individually insulated electrical wire conductors, comprising the steps of: removing the insulation adjacent the ends of the conductors to expose the wire conductors, connecting the wire conductors of one of said cables to the wire conductors of the other of said cables so that electrical signals can travel between the wire conductors in one of said cables and the wire conductors in the other of said cables, compressing an annular body of elastomeric material around the jacket of one of the cables using a clamp having an outer surface that will bond to an elastomer of a type used to form the jacket of the other of said cables, and molding a sheath of the elastomer of said type that will bond to the clamp on one of the cables and the insulating jacket on the other of said cables to provide a waterproof splice between the two multiconductor electric cables.

2. A splice for providing a waterproof covering between first and second electric cables, each cable having a plurality of individually insulated electrical wire conductors, enclosed by outer jackets of different electrical insulating materials, said insulated wire conductors of said first cable having end portions from which the insulation has been stripped that are electrically connected to stripped end portions of the insulated wire conductors of said second cable, a seal ring of elastomeric material surrounding the jacket of the first cable, a packing gland compressing the seal ring into sealing engagement with the jacket of the first cable, said packing gland having an outer surface that will form a bond with the material that forms the jacket of the second cable, and a sheath of the material that forms the jacket of the second cable molded over the connected insulated conductors and packing gland to form a bond with the jacket of the second cable and the outer surface of the packing gland to provide said waterproof covering between the first and second electric cables.

3. The splice of claim 2, wherein the outer jacket of the first cable is neoprene and the outer jacket of the second cable is urethane.

4. The splice of claim 2, wherein the outer jacket of the first cable is urethane and the outer jacket of the second cable is neoprene.

5. A waterproof splice of two multiconductor electric cables, each having a plurality of individually insulated electrical wire conductors, said cables enclosed by outer jackets of urethane and neoprene electrical insulating materials, respectively, said insulated wire conductors of one of said cables having end portions from which the insulation has been stripped that are electrically connected to stripped end portions of the wire conductors of the other of said cables, a seal ring of elastomeric material surrounding the jacket of the neoprene-jacketed cable, a packing gland compressing the seal ring into sealing engagement with the neoprene jacket, said packing gland having an outer surface that will form a bond with the urethane that forms the jacket of the other of said cables, and a sheath of urethane molded over the splice to form a bond with the jacket of the urethane-jacketed cable and the outer surface of the packing gland to provide a waterproof cover of the splice between the two electric cables.

6. A waterproof splice of two multiconductor electric cables, each having a plurality of individually insulated electrical wire conductors, said cables enclosed by outer jackets of urethane and neoprene electrical insulating materials, respectively, said insulated wire conductors of one of said cables having end portions from which the insulation has been stripped that are electrically connected to stripped end portions of the wire conductors of the other of said cables, a seal ring of elastomeric material surrounding the jacket of the urethane-jacketed cable, a packing gland compressing the seal ring into sealing engagement with the urethane jacket, said packing gland having an outer surface that will form a bond with the neoprene that forms the jacket of the other of said cables, and a sheath of neoprene molded over the splice to form a bond with the jacket of the neoprene-jacketed cable and the outer surface of the packing gland to provide a waterproof cover of the splice between the two electric cables.

7. A method of making a waterproof splice cover for electrical cables having incompatible insulating materials, comprising the steps of:

compressing an annular body of elastomeric material around the insulating material of one of said cables using a clamp; and molding a sheath of a material that will bond to the clamp and to the insulating material on the other of said cables.

8. A waterproof splice cover for two electrical cables having incompatible insulating materials, comprising:

an elastomeric seal member surrounding the insulating material of one of said cables;

means for compressing the seal member into sealing engagement with the insulating material of said one of said cables; and a sheath molded to form a bond with the compressing means on said one of said cables and the insulating material on the other of said cables.

* * * * *